United States Patent [19]

Tahara et al.

[11] Patent Number: 5,298,570
[45] Date of Patent: Mar. 29, 1994

[54] BIODEGRADABLE HYDROPHILIC CROSSLINKED POLYMER, PROCESS FOR PRODUCING IT, AND USES THEREOF

[75] Inventors: Hideyuki Tahara, Osaka; Hiroshi Ito, Takatsuki; Masahito Takagi, Takatsuki; Yoshio Irie, Himeji; Keishi Tsuboi, Akashi; Shigeru Yamaguchi, Himeji, all of Japan

[73] Assignee: Nippon Shokubai Co., Ltd., Osaka, Japan

[21] Appl. No.: 932,551

[22] Filed: Aug. 20, 1992

[30] Foreign Application Priority Data

Aug. 23, 1991 [JP] Japan .................... 3-212335

[51] Int. Cl.$^5$ .................... C08F 8/14; C08F 122/02
[52] U.S. Cl. .................... 525/329.7; 525/329.9; 525/330.1; 525/330.5; 525/374; 525/386; 526/213; 526/318.3; 526/318.42; 526/932; 523/124
[58] Field of Search ................ 525/329.9, 330.1, 330.5, 525/360, 374, 384, 385, 386, 329.7; 526/91, 213, 317.1, 318.2, 318.3, 318.4, 318.42, 932

[56] References Cited

U.S. PATENT DOCUMENTS

| | | |
|---|---|---|
| 3,687,909 | 8/1972 | Vaughn .................... 525/330.1 |
| 4,120,839 | 10/1978 | Emmons et al. .................... 260/29.2 EP |
| 4,666,983 | 5/1987 | Tsubakimoto et al. .................... 525/119 |
| 4,727,111 | 2/1988 | Pettit, Jr. et al. .................... 525/329.9 |
| 4,758,641 | 7/1988 | Hsu .................... 526/317.1 |
| 4,764,554 | 8/1988 | Tonge .................... 526/317.1 |
| 4,800,220 | 1/1989 | Ribba .................... 526/318.42 |
| 4,808,641 | 2/1989 | Yagi et al. .................... 524/5 |
| 4,870,120 | 9/1989 | Tsubakimoto et al. .................... 524/5 |
| 4,980,088 | 12/1990 | Boeckh et al. .................... 252/546 |
| 5,064,563 | 11/1991 | Yamaguchi et al. .................... 252/174.23 |
| 5,104,951 | 4/1992 | Seelman-Eggebert et al. .................... 526/318.2 |
| 5,135,677 | 8/1992 | Yamaguchi et al. .................... 252/180 |
| 5,159,041 | 10/1992 | Khoshdel et al. .................... 526/318.2 |
| 5,183,707 | 2/1993 | Herron et al. .................... 428/368 |

FOREIGN PATENT DOCUMENTS

| | | |
|---|---|---|
| 0240586 | 10/1987 | European Pat. Off. . |
| 0256144 | 2/1988 | European Pat. Off. . |
| 0291590 | 11/1988 | European Pat. Off. . |
| 0377448 | 7/1990 | European Pat. Off. . |
| 1948755 | 4/1970 | Fed. Rep. of Germany . |
| 2377421 | 8/1978 | France . |
| 2525121 | 10/1983 | France . |
| 54-52196 | 4/1979 | Japan . |
| 54-139929 | 10/1979 | Japan . |
| 60-16851 | 1/1985 | Japan . |
| 60-161365 | 8/1985 | Japan . |
| 61-31497 | 2/1986 | Japan . |

(List continued on next page.)

OTHER PUBLICATIONS

Polymer Preprints, Japan, vol. 38, No. 3 (1989).

*Primary Examiner*—Paul R. Michl
*Assistant Examiner*—Tae H. Yoon
*Attorney, Agent, or Firm*—Armstrong, Westerman, Hattori, McLeland & Naughton

[57] ABSTRACT

The invention provides biodegradable crosslinked polymers, which have a chelating effect and a dispersing effect to disperse an oily substance and an inorganic substance hardly soluble in water and are excellent in dispersion into water. The crosslinked polymers comprise; an ingredient of molecular weight 5,000 or less in 50% by weight, a bond having at least one of a group (II) represented by the chemical formula —CO—O— and a group (III) represented by the chemical formula —CO—NH— as a composition unit between main chains having a water-soluble oligomer structure having the functional group (I) represented by the general formula —COOM (here, M denotes anyone of a hydrogen atom, monovalent metal, divalent metal, trivalent metal, an ammonium group and organic amine group.), and showing a viscosity of 1,000 cP or less at 20° C. by a 20% by weight aqueous solution of the crosslinked polymer.

11 Claims, No Drawings

FOREIGN PATENT DOCUMENTS

| | | |
|---|---|---|
| 61-31498 | 2/1986 | Japan . |
| 62-30648 | 2/1987 | Japan . |
| 62-119147 | 5/1987 | Japan . |
| 62-216950 | 9/1987 | Japan . |
| 62-241855 | 10/1987 | Japan . |
| 62-292664 | 12/1987 | Japan . |
| 63-162562 | 7/1988 | Japan . |
| 63-291840 | 11/1988 | Japan . |
| 63-305199 | 12/1988 | Japan . |
| 63-305200 | 12/1988 | Japan . |
| 1-122947 | 5/1989 | Japan . |
| 1-306411 | 12/1989 | Japan . |
| 2-36210 | 2/1990 | Japan . |
| 8702044 | 4/1987 | PCT Int'l Appl. . |
| 1285609 | 8/1972 | United Kingdom . |
| 1510190 | 5/1978 | United Kingdom . |

5,298,570

BIODEGRADABLE HYDROPHILIC CROSSLINKED POLYMER, PROCESS FOR PRODUCING IT, AND USES THEREOF

BACKGROUND OF THE INVENTION

The present invention relates to a biodegradable crosslinked polymer having a chelating effect and a function to disperse an oily substance and an inorganic substance hardly soluble in water as well as showing excellent dispersion performance into water and further, the invention relates to a process for producing the crosslinked polymer. Still further, it relates to use of the crosslinked polymer, especially, relates to detergency enhanced by combining this crosslinked polymer with a detergent composition and, thence, a builder excellent in biodegradability and a detergent composition containing this builder.

In addition, it relates to a biodegradable medicine, which may be used involving discharge into environment at a final stage, such as a fiber-treating agent, an inorganic pigment dispersant and a water treatment agent.

When a builder is combined with a detergent, the chelating and dispersing effects of the builder increase detergency of the detergent.

Preferable builders conventionally and widely used from viewpoints of performance, safety and price are condensed phosphates such as sodium tripolyphosphate and the like. However, since phosphorous compounds of these types are an origin of eutrophication for a river, lake, marsh and the like, their use has been limited in recent years and substitution of them is in rapid progress.

At present, instead of the condensed phosphates such as sodium tripolyphosphate and the like, zeolite which is not problematic in the eutrophication and safety is used. However, the zeolite is not enough in builder performance and also, it is insoluble in water and, thence, its combination with a liquid type cleaner is not possible and precipitation with the washing may occur.

On the other hand, instead of the above-described inorganic compounds, an organic compound, for example, a polyelectrolyte such as a polyacrylate and polymaleate has been used as a builder. The polyacrylate and polymaleate are superior in the builder performance, but there is a defect that they are poor in biodegradability.

In Japanese Official Patent Provisional Publication, showa 54-52196, a polyacetal carboxylate has been proposed as a polymer type builder improved in biodegradability. The polyacetal carboxylate is not economical because of its high material cost and also, the process for producing the carboxylate is complicate and not of practical use. In Japanese Official Patent Provisional Publications, showa 63-305199 and 63-305200 and heisei 1-306411 and 2-36210, a water-soluble polymer made by polymerizing a monomer having at least two of an ethylenically unsaturated double bond has been proposed. A water-soluble polymer of this type, according to studies of the present inventors, is difficult in controlling the molecular structure and contains a considerable proportion of molecules not having a structure suitable to biodegradation, and therefore, there is a problem that this type polymer may contain an ingredient which does not undergo biodegradation at all or may require a long period of time for biodegradation. Graft polymers of polysaccharides with acrylic acid and the like in Japanese Official Patent Provisional Publication, showa 61-31497, and graft polymers of monosaccharides and/or oligosaccharides with acrylic acid and the like in Japanese Official Patent Provisional Publication, showa 61-31498, have been proposed. In the graft polymers of these types, only the parts of polysaccharides, monosaccharides and oligosaccharides undergo biodegradation, but the graft parts due to acrylic acid and the like have large molecular weights and do not undergo biodegradation.

Like this, all of the forementioned polymers have defects and, therefore, any polymer satisfactory enough has not yet found.

In the field of fiber-treating agents, a polyacrylate has been conventionally used by combining it with a chelating agent to elevate dispersing performance. In the field of inorganic pigment dispersants, a polyacrylate and a maleic acid-acrylic acid copolymer salt have been used to decrease the viscosity of a solution of dispersed slurry and to elevate the stability of viscosity. In the field of water treatment agents, a polymer such as polyacrylate, polymaleate and the like has been used instead of the conventional phosphine-based medicine as a scale suppressant of calcium carbonate.

However, these polycarboxylic acid-based polymers show good performance in various kinds of use, but they have a defect, that is poor in biodegradability.

SUMMARY OF THE INVENTION

It is a first object of the present invention to provide a crosslinked polymer having chelating and dispersing effects, being excellent in dispersing performance into water, and being superior in biodegradability. A second object is to provide a process for producing such the crosslinked polymer with good efficiency or with a simple procedure and also, which is possible to practice industrially. A third object of this invention is to provide a builder which is able to increase detergency by combining with a detergent composition independent of this composition condition, and which can be decomposed by an organism such as a microorganism and the like, does not cause eutrophication when being excreted into a river, lake and marsh, does not accumulate in surplus, and is safe enough. Furthermore, a fourth object is to provide a detergent composition in which a builder of the above type is combined.

Still further, a fifth object is to provide a biodegradable agent in use which involves discharge into environment at a final stage, for example, the use as a fiber-treating agent, an inorganic pigment dispersant, a water treatment agent or the like.

The present inventors intensively studied about polymers having chelating and dispersing effects as well as hydrophilicity and excellent biodegradability. An important finding by us was that the chelating and dispersing effects are effectively afforded, if a water-soluble oligomer contains an ingredient having not the chelating and dispersing effects originally or having the effects slightly, but having a low molecular weight of a biodegradable grade in more than a certain extent and then, if a molecular weight increase is carried out by combining water-soluble oligomers of the above kind one another at positions on their main chains through bonds having the undermentioned biodegradable groups (II) and/or (III). This finding led to completion of this invention satisfactory for the forementioned requirements.

Accordingly, the present invention provides a biodegradable hydrophilic crosslinked polymer;

having a structure in which a bond having at least one of a group (II) represented by the chemical formula —CO—O— and a group (III) represented by the chemical formula —CO—NH— as a composition unit is formed among each of main chains, said main chains being made of a water-soluble oligomer which contains an ingredient having a molecular weight of 5,000 or less in 50% by weight or more and which has a functional group (I) represented by the general formula —COOM (herein, M denotes any one of a hydrogen atom, monovalent metal, divalent metal, trivalent metal, an ammonium group and organic amine group);

showing a viscosity of 1,000 cP or less at 20° C. by a 20% by weight aqueous solution of said crosslinked polymer.

The present invention provides a process for producing a biodegradable hydrophilic crosslinked polymer, of which 20% by weight aqueous solution shows a viscosity of 1,000 cP or less shown at 20° C., comprising a step of combining a water-soluble oligomer by a crosslinking agent:

said water-soluble oligomer has an ingredient of 5,000 or less in molecular weight in 50% by weight or more and the functional group (I); and said crosslinking agent has either (not only) at least one of the groups (II) and (III), or (but also) is capable of forming at least one of the above-described groups (II) and (III).

(hereinafter, this production process is sometimes referred to as "the later crosslinking process".)

This later crosslinking process is a process, wherein the water-soluble oligomer is a water-soluble oligomer (A); which is made by polymerizing a monomer component, composed of 50 to 100 mole % of at least one monomer (a) selected from the group consisting of a monoethylenically unsaturated carboxylic acid of 3 to 6 in carbon number and salts of this acid, and a residual % of another monoethylenically unsaturated monomer (b) capable of copolymerizing with (a); and said water-soluble oligomer (A) comprises an ingredient having a molecular weight of 5,000 or less in 50% by weight or more, has the functional group (I);

the crosslinking agent is a compound (B), which has at least two of the functional group (IV) capable of reacting with a functional group which the water-soluble oligomer (A) has, and which has either (not only) at least one of the groups (II) and (III) between said functional group (IV), or (but also) is capable of forming at least one of the groups (II) and (III) by a reaction of the functional group (IV) with the functional group which the water-soluble oligomer (A) has;

the reaction of said water-soluble oligomer (A) with the compound (B) is carried out by using those in such amounts as the mole ratio between the functional group (IV) of the compound (B) to the functional group of the water-soluble oligomer (A) is shown by the equation;

$$\frac{\text{the functional group (IV)}}{\text{the functional group of (A)}} = 0.01 \sim 1.0.$$

The present invention also provides a builder being made by a biodegradable hydrophilic crosslinked polymer;

having a structure in which a bond having at least one of a group (II) and a group (III) as a composition unit is formed among each of main chains, said main chains being made of a water-soluble oligomer which contains an ingredient having a molecular weight of 5,000 or less in 50% by weight or more and which has a functional group (I);

showing a viscosity of 1,000 cp or less at 20° C. by a 20% by weight aqueous solution of said crosslinked polymer.

This builder may be made by a hydrophilic crosslinked polymer produced by the forementioned crosslinking process.

This invention further provides a detergent composition containing the above-described builder and a surfactant.

This invention still further provides a fiber-treating agent, an inorganic pigment dispersant and a water treatment agent, which are made by containing the hydrophilic crosslinked polymer of this invention.

The hydrophilic crosslinked polymer of this invention has a structure being crosslinked by a bond having at least one of the groups (II) and (III) as a composition unit. A main chain of this structure consists of only a carbon—carbon single bond or has a structure, of which main body is the carbon—carbon single bond. This main chain converts a water-soluble oligomer containing a molecular weight component, designed as described above, in a defined proportion by the crosslinked chain being cut.

It is required that the water-soluble oligomer contains an ingredient having a molecular weight of 5,000 or less in 50% by weight or more. In a preferable case, the oligomer contains an ingredient having a molecular weight of from 300 to 5,000 in 50% by weight or more. If the ingredient having a molecular weight of 5,000 or less is less than 50% by weight, a portion not biodegradable may remain or the biodegradation takes a long period of time. Although, in a preferable case, the water-soluble oligomer contains an ingredient having a molecular weight of 300 to 5,000 in 50% by weight or more, if an ingredient having a molecular weight of 300 to 2,500 is contained in a major amount in the ingredient having a molecular weight of 300 to 5,000, the biodegradability is further favored. Each molecule of the water-soluble oligomers is required to have the functional group (I). This is because the functional group (I) reveals the chelating and dispersing effects. A content proportion of the functional group (I) in a crosslinked polymer is not especially specified, but a preferable content is 5 mmol per gram or more. If it is less than this, the chelating and dispersing effects may diminish.

A bond having at least one of the groups (II) and (III) as a composition unit is a bond by which the group (II) or (III) directly combines with a carbon atom in a main chain, or a bond which comprises another intervening group between the group (II) or (III) and at least one carbon atom of the main chain. The here-described another intervening group may be of any kind and is not especially limited.

A hydrophilic crosslinked polymer of this invention is required to have a viscosity of 1,000 cP or less at 20° C. by a 20% by weight aqueous solution of the crosslinked polymer, and a preferable viscosity is 500 cP or less. If the crosslinked polymer has a viscosity larger than 1,000 cP, the chelating and dispersing effects become unsatisfactory due to a decrease in dispersion performance and also, handling becomes hard.

A hydrophilic crosslinked polymer of this invention is preferably obtained by the forementioned late crosslinking process, explained hereinafter. The water-soluble oligomer (A) is obtained by polymerizing monomer components, in which the monomer (a) is in a range of from 50 to 100 mol % and the monomer (b) is a residual part. If the monomer (a) is less than 50 mol %, in other words, if the monomer (b) is more than 50 mol %, the chelating and dispersing effects of an obtaining crosslinked polymer is unsatisfactory. To obtain the water-soluble oligomer (A) from the monomers (a) and (b), a polymerization reaction is carried out using a polymerization-initiator. The polymerization can be performed by a polymerization reaction in a solvent or a bulk polymerization process. The polymerization reaction in a solvent may be performed either by a batch operation or a continuous operation and, a preferable solvent using in this reaction is water; a lower alcohol such as methanol, ethanol, isopropanol and the like; an aromatic hydrocarbon such as benzene, toluene, xylene and the like; an alicyclic hydrocarbon such as cyclohexane and the like; an aliphatic hydrocarbon such as n-hexane and the like; ethyl acetate; a ketone such as acetone, methyl ethyl ketone and the like; dimethylformamide; and 1,4-dioxane and the like.

When the polymerization reaction is performed in a water medium, a water-soluble polymerization-initiator such as ammonium persulfate and an alkali metal persulfate and hydrogen peroxide and the like is used. In this case, an accelerator such as sodium hydrogen sulfite and the like may be jointly used. On the other hand, in a polymerization reaction in which an organic solvent is used, there is used as an polymerization-initiator a peroxide such as benzoyl peroxide, lauroyl peroxide and the like; a hydroperoxide such as cumene hydroperoxide and the like; and an aliphatic azo compound such as azobis(isobutyronitrile) and the like. In this case, an accelerator such as an amine compound and the like may be jointly used. In a case where a mixture solvent of water and a lower alcohol is used, proper selection from the above-described various kinds of polymerization initiators and from combination of polymerization-initiators with accelerators is carried out for use. A polymerization temperature is properly set according to an using solvent and a polymerization-initiator and, in an usual case, it is in a range of from 0° to 120° C.

The bulk polymerization reaction is carried out by using a polymerization-initiator such as used in the forementioned polymerization reaction in an organic solvent and in a temperature range of from 50° to 150° C.

The polymerization may be carried out in the presence of a molecular weight regulator such as thioglycolic acid, mercaptoethanol, butanethiol and the like.

A hydrophilic crosslinked polymer of this invention is obtained by a reaction of the formed water-soluble oligomer (A) with the compound (B). It is required to use the compound (B) in an amount so that a mole ratio between the functional group (IV) which B has, and the functional group (IV-A) having reactivity with the functional group (IV) of the compound (B) among the functional groups which A has, is satisfactory for the following equation;

$$\frac{[\text{functional group (IV) which B has}]}{[\text{functional group (IV-A) which A has}]} = 0.01 \sim 1.0.$$

Here, the functional group (IV-A) which A has is at least one of the functional group (I) and a functional group other than I. In a case where the compound (B) has not the group (II) or (III) as a composition unit, at least one of the groups (II) and (III) must be formed as a composition unit by a reaction of the functional group (IV-A) with the group (IV) which B has. If it is not so, that is, in a case where the compound (B) has at least one of the groups (II) and (III) as a composition unit, a composition unit other than the group (II) or (III) may be formed by a reaction of the functional group (IV-A) with the group (IV) which B has. A functional group other than the group (I) may be at least one kind of an amino group, a hydroxyl group, sulfonic acid group and the like, but it is not limited with these. The functional group (I) originates from the monomer (a) that is a monomer component, and a functional group other than I originates from the monomer (b). If the ratio of compound (B) is below the forementioned range, the water-soluble oligomer not crosslinked remains a lot and, if the ratio exceeds the range, the dispersing effect of an obtained crosslinked polymer is not unsatisfactory. A process of undergoing a reaction of the water-soluble oligomer (A) with the compound (B) is not especially limited and, for example, it is carried out in an aqueous solution, an organic solvent, or in a condition of no solvent. The reaction temperature is not especially limited as far as it is a temperature at which the reaction of the water-soluble oligomer (A) with the compound (B) proceeds, but a preferable temperature is in a range of from 50° to 200° C. In case of necessity, a catalyst may be used.

To carry out the crosslinking reaction in a water system is preferred from viewpoints of resource saving, environmental problems and safety. More preferable is to subject a water-soluble oligomer and a substance reactive with this oligomer to thermal treatment at a temperature of 50° to 200° C. and to carry out a crosslinking reaction eliminating water. A preferable device for this treatment is a common drier for producing powder such as a drum drier, belt conveyor type hot air drier, belt conveyor type heat-conducting drier and the like. In this case, it is preferred to carry out reaction in a slurry condition and, by repeating drying and water-adding, a hydrophilic crosslinked polymer having a higher molecular weight can be obtained.

The monomer (a) used in this invention is a monoethylenic unsaturated carboxylic acid having a carbon number of 3 to 6 and its salt and, for example, acrylic acid, methacrylic acid, 2-chloroacrylic acid, crotonic acid, maleic acid, fumaric acid, itaconic acid, citraconic acid, aconitic acid and salts of these acids (for example, a monovalent metal salt, divalent metal salt, trivalent metal salt, an ammonium salt and organic amine salt). In this invention, one kind or two kinds or more of these acids and salts can be used. Among these acids and salts, especially preferable ones are acrylic acid, methacrylic acid and maleic acid as well as a monovalent metal salt, divalent metal salt, trivalent metal salt, an ammonium salt and organic amine salt of these three acids.

The monomer (b) used in this invention is another type monoethylenic unsaturated monomer capable of copolymerizing with the monomer (a) and, for example, various kinds of compounds are used in a range that the water-soluble oligomer (A) being made by copolymerizing with the monomer (a) is soluble in water. Preferable examples of the monomer (b) are, for example, α-olefins having a carbon number of 2 to 8 such as ethylene, propylene, isobutylene, m-butylene, isoamylene, diisobutylene and the like; alkyl esters of acrylic acid and methacrylic acid having a carbon number of 4 to 8 such as methyl (meth)acrylate, ethyl (meth)acrylate, isopropyl (meth)acrylate, n-propyl (meth)acrylate, n-butyl (meth)acrylate, isobutyl (meth)acrylate and the like; hydroxyalkyl esters of acrylic acid and methacrylic acid having a carbon number of 5 to 8 such as hydroxyethyl (meth)acrylate, hydroxy-n-propyl (meth)acrylate, hydroxyisopropyl (meth)acrylate, hydroxy-n-butyl (meth)acrylate, hydroxy-isobutyl (meth)acrylate and the like; polyether mono(meth)acrylates having a carbon number of 6 to 104 such as polyethylene glycol mono(meth)acrylate, polypropylene glycol mono(meth)acrylate, polyethylene glycol polypropylene glycol mono(meth)acrylate and the like; sulfoalkyl (meth)acrylates having a carbon number of 4 to 10 such as 2-sulfoethyl (meth)acrylate, 2-sulfopropyl (meth)acrylate, 3-sulfopropyl (meth)acrylate, 1-sulfopropan-2-yl (meth)acrylate, 2-sulfobutyl (meth)acrylate, 3-sulfobutyl (meth)acrylate, 4-sulfobutyl (meth)acrylate, 1-sulfobutan-2-yl (meth)acrylate, 1-sulfobutan-3-yl (meth)acrylate, 2-sulfobutan-3-yl (meth)acrylate, 2-methyl-2-sulfopropyl (meth)acrylate, 1,1-dimethyl-2-sulfoethyl (meth)acrylate and the like; sulfoalkoxypolyalkylene glycol mono(meth)acrylates having a carbon number of 7 to 97 such as sulfoethoxypolyethylene glycol mono(meth)acrylate, sulfopropoxypolyethylene glycol mono(meth)acrylate, sulfobutoxypolyethylene glycol mono(meth)acrylate, sulfoethoxypolypropylene glycol mono(meth)acrylate, sulfopropoxypolypropylene glycol mono(meth)acrylate, sulfobutoxypolypropylene glycol mono(meth)acrylate and the like as well as monovalent metal salts, divalent metal salts, trivalent metal salts, an ammonium salts and organic amine salts of the above-described glycol mono(meth)acrylates; polyalkylene glycol mono(meth)allyl ethers having a carbon number of 5 to 104 such as polyethylene glycol monoallyl ether, polypropylene glycol monoallyl ether, polyethylene glycol polypropylene glycol monoallyl ether, polyethylene glycol monomethallyl ether, polypropylene glycol monomethallyl ether, polyethylene glycol polypropylene glycol monomethallyl ether and the like; alkenyl acetates having a carbon number of 4 to 7 such as vinyl acetate, propenyl acetate and the like (the alkenyl acetates, after polymerization, can be converted into vinyl alcohols by hydrolysis in part or wholly); aromatic vinyl compounds having a carbon number of 8 to 10 such as styrene, p-methylstyrene and the like; aminoethyl (meth)acrylates having a carbon number of 5 to 10 such as dimethylaminoethyl (meth)acrylate, diethylaminoethyl (meth)acrylate and the like; (meth)acrylamides having a carbon number of 3 to 12 such as (meth)acrylamide, dimethylaminopropyl(meth)acrylamide, diethylaminopropyl(meth)acrylamide and the like; monoethylenic unsaturated sulfonic acids having a carbon number of 2 to 4 such as 2-acrylamido-2-methylsulfonic acid, vinylsulfonic acid, allylsulfonic acid and the like; monoethylenic unsaturated phosphonic acids having a carbon number of 2 to 4 such as vinylphosphonic acid, allylphosphonic acid and the like; and (meth)acrylonitrile, acrolein, (meth)allyl alcohol, isoprenol and the like. All the compounds can be used alone or in combination of two or more kinds.

In the above-described late crosslinking process, to use the following maleic acid-based polymer as the water-soluble oligomer (A) is preferred to elevate biodegradability of the hydrophilic crosslinked polymer of this invention. The maleic acid-based polymer is made by polymerizing in an aqueous solution a monomer component, which is composed of 50 to 100 mole % of the monomer (a) and of a residue mole % of the monomer (b); wherein a 20 to 100% by weight part of the monomer component (a+b) is at least one kind selected from maleic acid and its salt as the monomer (a), and a residual % part of the monomer component (a+b) is the monomer (a) excepting the maleic acid and its salt plus water-soluble ones of the monomer (b). This polymerization reaction in an aqueous solution is carried out in the presence of a metal ion of at least one or a plural kind selected from a group consisting of an iron ion, an vanadium atom containing ion and a copper ion in a weight ratio of from 0.5 to 300 ppm to said monomer component and using hydrogen peroxide as a polymerization catalyst in the proportion of 8 to 500 g per 1 mole of said monomer component.

Preferable examples of a vanadium atom containing ion, an iron ion and a copper ion in this invention are, for example, $V^{2+}$, $V^{3+}$, $VO^{2+}$, $VO_3{}^{2-}$, $Fe^{3+}$, $Fe^{2+}$, $Cu^{2+}$ and the like and, among those, $VO^{2+}$, $Fe^{3+}$ and $Cu^{2+}$ are especially preferable. In order to elevate a polymerization character, $VO^{2+}$ is especially preferred. The condition for supplying these polyvalent metal ions into a polymerization system has no special limitation and, a polyvalent metal compound or a metal simple substance can be used as far as it undergoes ionization in a polymerization system.

The compound (B) used in this invention has at least two of the functional group (IV) capable of reacting with the functional group which the water-soluble oligomer (A) or the maleic acid-based polymer has, and also, it is a compound having at least one of the forementioned groups (II) and (III) as a composition unit between said functional groups (IV) or a compound forming at least one of the groups (II) and (III) by a reaction of the functional group (IV) with the functional group which A or the maleic acid-based polymer has. Here, preferable examples of the functional group (IV) are, for example, a hydroxyl group, an amino group, epoxy group, isocyanate group and the like, and one kind or two kinds or more in combination among these groups are used.

Practical examples of the compound (B) are, for example, polyhydric alcohols such as ethylene glycol, triethylene glycol, tetraethylene glycol, polyethylene glycol, glycerin, polyglycerin, propylene glycol, polyoxypropylene, an oxyethylene-oxypropylene block copolymer, diethanolamine, triethanolamine, pentaerythritol, sorbitol, a sorbitane fatty acid ester, hydroxyacetic acid glycol monoester, lactic acid glycol monoester, hydroxypivalic acid neopentylene glycol ester, polyvinylalcol, a partially saponified product of polyvinyl acetate and the like; lactone polymers having hydroxyl groups at both terminal ends such as a poly-ε-caprolactone having hydroxyl groups at both the terminal ends and the like; polyglycidyl compounds such as ethylene glycol diglycidyl ether, polyethylene glycol diglycidyl ether, glycerol polyglycidyl ether, diglycerol polyglycidyl ether, polyglycerol polyglycidyl ether, sorbitol polyglycidyl ether, pentaerythritol polyglycidyl ether, propylene glycol diglycidyl ether, polypropylene glycol diglycidyl ether, resorcinol diglycidyl ether, 1,6-hexanediol diglycidyl ether, adipinic acid diglycidyl ester, o-phthalic acid diglycidyl ester, terephthalic acid diglycidyl ester, p-hydroxybennzoic acid glycidyl ester ether and the like; polyamine such as ethylenediamine, diethylenetriamine, triethylenetetramine, tetraethylenepentamine, pentaethylenehexamine, polyethyleneimine, phenylenediamine and the like, polyaziridine such as 2,2-bish ydroxymethylbutanoltris[3-(1-aziridinyl)propionate], 1,6-hexamethylenediethyleneurea, diphenylmethane-bis-4,4'-N,N'-diethyleneurea and the like; polyaldehyde such as glutaraldehyde, glyoxal and the like; and polyisocyanate such as tolylene 2,4-diisoccyanate, hexamethylenediisocyanate and the like; compounds having both a carboxyl group and a hydroxyl group such as tartaric acid, citric acid, malic acid, lactic acid and the like; imino acids such as 2,2'-iminodisuccinic acid, 3-hydroxy-2,2'-iminodisuccinic acid and the like; and amino acids such as aspartic acid, β-alanine and the like. The compounds are used alone or in combination of two or more kinds.

In a case where at least one composition unit of the groups (II) and (III) is formed by a reaction of the water-soluble oligomers (A) one another, a part of the water-soluble oligomer (A) can be made to the compound (B). That is, the compound (B) in this case is the same as the water-soluble oligomer (A).

The hydrophilic crosslinked polymer of this invention is superior in chelating and dispersing effects, shows hydrophilicity (preferably, a water-soluble character) and excellent biodegradability. Because of this, the hydrophilic crosslinked polymer of this invention can be used as a builder of a cleaner. The builder of this invention consists of the hydrophilic crosslinked polymer of this invention and, by combining with a detergent composition, the detergency of this composition is elevated.

The detergent composition of this invention contains a surfactant agent and the builder of this invention as essential components, and it can be used for a detergent in any condition of a powder, solid and liquid. Preferable surfactants are an anionic surfactant, a nonionic surfactant, an ampholytic surfactant and a cationic surfactant, and these surfactants are used alone or in combination of two or more kinds. The surfactant and the builder of this invention are used, for example, in a proportion of 0.5 to 100 parts by weight of the builder to 100 parts by weight of the surfactant, but it is not limited with the proportion. If the builder exceeds the proportion range, an economical disadvantage occurs and, if it is less, a merit by adding this builder is not practically expected.

The builder of this invention can be used by combining it with a conventional builder, for example, a condensed phosphate, zeolite, citrate and the like. In this case, the proportion for use is properly set and not especially limited.

Furthermore, in addition to the surfactant and builder, other ingredients which are conventionally used for a detergent composition may be combined with the detergent composition of this invention. Examples of the other ingredients are, for example, an alkali agent, inorganic electrolyte, a chelating agent, an agent to prevent recontamination, enzyme, a bleach, fluorescent agent, an antioxidant, a solubilizer, colorant, perfume and the like. An amount to be combined is, for example, an usual amount.

The fiber-treating agent of this invention can be used for a purpose such as dispersion or removal of paste remaining on fiber, metal salt, metal oxide, and other pollutants in a process of scouring, dyeing, bleaching, soaping and the like. An applicable fiber is not especially limited, but preferable ones are, for example, cellulose-based fibers such as Nylon, a polyester and the like; animal fibers such as wool and silk ane the like; semisynthetic fibers such as rayon and the like; and textiles and mixed fabrics of these fibers. The fiber-treating agent may consist of only the hydrophilic crosslinked polymer of this invention, but in the case of application for a scouring process, it is preferred to combine an alkali agent and a surface-active agent with the hydrophilic crosslinked polymer of this invention, and in the case of application for a bleaching process, it is preferred to combine silicic acid-based chemicals such as sodium silicate and the like as a decomposition suppresant of an alkali-based bleaching agent with the hydrophilic crosslinked polymer of this invention.

The inorganic pigment dispersant of this invention displays excellent performance as a dispersant of the inorganic pigment, which is, for example, a light type or heavy type of calcium carbonate using for paper-coating, clay and the like. The inorganic pigment dispersant of this invention may consist of only the hydrophilic crosslinked polymer of this invention, but polyphosphoric acid and its salt, phosphonic acid and its salt, polyvinyl alcohol and the like may be used as other kinds of combining agents in a range of not disturbing the effects of this invention. By adding a small amount of the inorganic pigment dispersant of this invention, instead of a conventional inorganic pigment dispersant, into such an inorganic pigment as described above (for example, in a ratio of 0.05 to 2.0 parts by weight to 100 parts by weight of an inorganic pigment) and, thereby, by dispersing the inorganic pigment into water, there can be produced inorganic pigment slurry of a high concentration, which shows low viscosity and high fluidity as well as excellence in stability with the passage of time of these performance (for example, calcium carbonate slurry of high concentration). Since the hydrophilic crosslinked polymer of this invention is excellent in biodegradability, an influence on environment can be minimized, when a paper comprising application of the inorganic pigment dispersant of this invention is dumped into ground as garbage.

The water treatment agent of this invention is useful for scale inhibitor in a cooling water system, a boiler water system, a desalination plant, a pulp digestor, a black liquor evaporator and the like, and although it may be used alone as a water treatment agent, conversion into a composition combined with an anticorrosive such as a polyphosphate, a phosphonate and others, or with a slime-controlling agent, a chelating agent or the like is possible. Concerning the water treatment agent of this invention, even if discharged water containing the hydrophilic crosslinked polymer comes to the outside after use, because the biodegradability is excellent, the influence on environment is very little.

The hydrophilic crosslinked polymer of this invention is easy in biodegradation at the parts of the groups (II) and (III) and, with this biodegradation, a water-soluble oligomer containing an ingredient of molecular weight 5,000 or less in 50% by weight or more is formed. A water-soluble oligomer of this type has a molecular weight too small to display the chelating and dispersing effects, but biodegradation of this is possible.

That is, although the hydrophilic crosslinked polymer of this invention has a molecular weight too small to display the chelating and dispersing effects, its molecular weight increases up to such magnitude that the chelating and dispersing effects emerge, by combining one another of the main chains having a water-soluble oligomer structure of a molecular weight of biodegradable magnitude through a biodegradable group. Accordingly, compatibility of the biodegradability with the chelating and dispersing effects became possible.

According to the forementioned late crosslinking process, since the water-soluble oligomers are crosslinked one another after they were once formed, the molecular weight of main chains are easy to set at proper magnitude.

Since the builder of this invention consists of the above-described hydrophilic crosslinked polymer, dispersion into water is excellent and biodegradability is superior, and thence, detergency of a detergent can be enhanced.

Since the fiber-treating agent, inorganic pigment dispersant and water treatment agent of this invention consist of comprising the hydrophilic crosslinked polymer of this invention as explained above, they are excellent in the dispersing and chelating performance and the biodegradability, and very useful for various kinds of use.

DESCRIPTION OF THE PREFERRED EMBODIMENTS

EXAMPLE

The present invention is illustrated by the following Examples of some preferred embodiments in comparison with Comparative Examples not according to the invention. However, the invention is not limited with the Examples.

Hereinafter, the "part" denotes "part by weight".

EXAMPLE 1

Into a glass-made reaction vessel equipped with a thermometer, stirrer, distilling receiver and reflux condenser were placed and dissolved 45.6 parts of dimethylformamide, 28.8 parts of polyacrylic acid which contains an ingredient of molecular weight 300 to 2,500 in 68% by weight and an ingredient having a molecular weight in a range of from over 2,500 to 5,000 or less in 11% by weight, that in turn contains an ingredient of molecular weight 300 to 5,000 in 79% by weight. To the obtained mixture solution were added with stirring 4 parts of ethylene glycol and 0.3 parts of 95% sulfuric acid, and the thus-obtained mixture was heated up to 150° C. Eliminating distilled water from the distilling receiver, the reaction mixture was still maintained for 5 hours to complete reaction and then, cooled to ordinary temperature, diluted with 150 parts of water, and completely neutralized with a 10% aqueous sodium hydroxide solution. After neutralization, the reaction mixture was separated to two phases. The water phase was taken out and added into a large amount of methanol. A precipitate thus-formed was taken by filtration and dried at 60° C. under a reduced pressure, whereby 39 parts of a hydrophilic crosslinked polymer was obtained.

By adding water to the obtained hydrophilic crosslinked polymer, a 20% by weight aqueous solution was prepared and measured at 20° C. by using a B type rotatory viscosimeter VISMETRON VG-A/1 model (made by Seiki kogyo kenkyusho) and a viscosity of 73 cP was found. A 10% by weight aqueous solution of the hydrophilic crosslinked polymer was prepared and, to this solution, a 48% by weight aqueous sodium hydroxide solution was added to adjust pH at 14, and the obtained solution was heated at reflux temperature for 4 hours for degradation. The degradated product was treated with gel permeation chromatography and the result indicated that molecular weight distribution of the polyacrylic acid part was the same as that of the precrosslinking polyacrylic acid. The conditions of gel permeation chromatography was as follows. Column: SHODEX OHpak KB-806, 804, 802.5, 802, 800P (made by Showa Denko Co., Ltd.). Eluent: a 0.2M potassium dihydrogen phosphate solution, which was adjusted at pH 6.9 by sodium hydroxide. Eluent volume: 0.5 ml per minute. Detector: a differential refractive index detector (Shodex RI SE-61, a product trade name of Showa Denko Co., Ltd.).

EXAMPLE 2

Into a glass-made reaction vessel equipped with a thermometer, stirrer, distilling receiver and reflux condenser were placed and dissolved 45.6 parts of dimethylformamide, 33.1 parts of polyacrylic acid which contains an ingredient of molecular weight 300 to 2,500 in 36% by weight and an ingredient having a molecular weight of from over 2,500 to 5,000 or less in 28% by weight, that in turn contains an ingredient of molecular weight 300 to 5,000 in 64% by weight, and to the obtained mixture solution were added with stirring 1 part of ethylene glycol and 0.37 parts of 95% sulfuric acid, and the thus-obtained mixture was heated up to 150° C. Eliminating distilled water from the water measuring tube, the reaction mixture was still maintained for 5 hours to complete reaction and then, cooled to ordinary temperature, diluted with 200 parts of water, and completely neutralized with a 10% aqueous sodium hydroxide solution. After neutralization, the reaction mixture was separated to two phases. The water phase was taken out and added into a large amount of methanol. A precipitate thus-formed was taken by filtration and dried at 60° C. under a reduced pressure, whereby 43 parts of a hydrophilic crosslinked polymer was obtained.

The viscosity determined for this hydrophilic crosslinked polymer similarly to the case of Example 1 was 150 cP. Molecular weight distribution of the polyacrylic acid part was the same as that of the precrosslinking polyacrylic acid, which was measured after degradation similarly to the case of Example 1.

EXAMPLE 3

Into a glass-made reaction vessel equipped with a thermometer, stirrer, distilling receiver and reflux condenser were placed and dissolved 35.3 parts of dimethylformamide, 25.6 parts of polyacrylic acid which contains an ingredient of molecular weight 300 to 2,500 in 46% by weight and an ingredient having a molecular weight of from over 2,500 to 5,000 or less in 29% by weight, that in turn contains an ingredient of molecular weight 300 to 5,000 in 75% by weight. To the obtained mixture solution were added with stirring 3.88 parts of polyethylene glycol having an average molecular weight of 300 and 0.29 parts of 95% sulfuric acid, and the thus-obtained mixture was heated up to 142° C. Eliminating distilled water from the water measuring tube, the reaction mixture was still maintained for 4 hours to complete reaction and then, cooled to ordinary temperature, diluted with 200 parts of water, and completely neutralized with a 10% aqueous sodium hydroxide solution. After neutralization, the reaction mixture was separated to two phases. The water phase was taken out and added into a large amount of methanol. A precipitate thus-formed was taken by filtration and dried at 60° C. under a reduced pressure, whereby 36 parts of a hydrophilic crosslinked polymer was obtained.

The viscosity determined for this hydrophilic crosslinked polymer similarly to the case of Example 1 was 85 cP. Molecular weight distribution of the polyacrylic acid part was the same as that of the precrosslinking polyacrylic acid, which was measured after degradation similarly to the case of Example 1.

EXAMPLE 4

Into a glass-made reaction vessel equipped with a thermometer, stirrer, distilling receiver and reflux condenser were placed and dissolved 86.4 parts of dimethylformamide, 26.8 parts of polyacrylic acid which contains an ingredient of molecular weight 300 to 2,500 in 46% by weight and an ingredient having a molecular weight of from over 2,500 to 5,000 or less in 29% by weight, that in turn contains an ingredient of molecular weight 300 to 5,000 in 75% by weight. With stirring, 2.11 parts of tetraethylenepentamine was added to the above mixture, which was then warmed to 140° C. Eliminating distilled water from the water measuring tube, the reaction mixture was still maintained for 7 hours to complete reaction and then, cooled to ordinary temperature, diluted with 200 parts of water, and completely neutralized with a 10% aqueous sodium hydroxide solution. After neutralization, the reaction mixture was separated to two phases. The water phase was taken out and added into a large amount of methanol. A precipitate thus-formed was taken by filtration and dried at 60° C. under a reduced pressure, whereby 35 parts of a hydrophilic crosslinked polymer was obtained.

The viscosity determined for this hydrophilic crosslinked polymer similarly to the case of Example 1 was 92 cP. Molecular weight distribution of the polyacrylic acid part was the same as that of the precrosslinking polyacrylic acid, which was measured after degradation similarly to the case of Example 1.

EXAMPLE 5

Into a glass-made reaction vessel equipped with a thermometer, stirrer and reflux condenser were placed and dissolved 37.6 parts of dimethylformamide, 27.2 parts of polyacrylic acid which contains an ingredient of molecular weight 300 to 2,500 in 46% by weight and an ingredient having a molecular weight of from over 2,500 to 5,000 or less in 29% by weight, that in turn contains an ingredient of molecular weight 300 to 5,000 in 75% by weight. With stirring, 1.93 parts of terephthalic acid diglycidyl ester ("DENACOL EX-711", a product trade name by Nagase Kasei Co., Ltd.) was added to the above mixture, which was then warmed to 105° C. The mixture was maintained for 4 hours under these conditions to complete reaction and then, cooled to ordinary temperature, diluted with 200 parts of water, and completely neutralized with a 10% aqueous sodium hydroxide solution. After neutralization, the reaction mixture was separated to two phases. The water phase was taken out and added into 1,000 parts of methanol. A precipitate thus-formed was taken by filtration and dried at 60° C. under a reduced pressure, whereby 33 parts of a hydrophilic crosslinked polymer was obtained.

The viscosity determined for this hydrophilic crosslinked polymer similarly to the case of Example 1 was 82 cP. Molecular weight distribution of the polyacrylic acid part was the same as that of the precrosslinking polyacrylic acid.

EXAMPLE 6

Into a glass-made reaction vessel equipped with a thermometer, stirrer and reflux condenser were placed and dissolved 84 parts of water and 21 parts of a sodium acrylate-vinyl alcohol copolymer; which contains an ingredient of molecular weight 300 to 2,500 in 52% by weight and an ingredient having a molecular weight of from over 2,500 to 5,000 or less in 20% by weight, that in turn contains an ingredient of molecular weight 300 to 5,000 in 72% by weight; and wherein the mole ratio of sodium acrylate to vinyl alcohol was 8 to 2. With stirring, 1.2 parts of adipinic acid diglycidyl ester ("DENACOL EX-701", a product trade name by Nagase Kasei Co., Ltd.) was added to the above mixture, which was then warmed to 95° C. The mixture was maintained for 4 hours under these conditions to complete reaction and then, cooled to room temperature, and poured into 1,000 parts of methanol. A precipitate thus-formed was taken by filtration and dried at 60° C. under a reduced pressure, whereby 24 parts of a hydrophilic crosslinked polymer was obtained.

The viscosity determined for this hydrophilic crosslinked polymer similarly to the case of example 1 was 80 cP. Molecular weight distribution of the acrylic acid-vinyl alcohol copolymer part was the same as that of the precrosslinking sodium acrylate-vinyl alcohol copolymer.

EXAMPLE 7

Into a glass-made reaction vessel equipped with a thermometer, distilling receiver, stirrer and reflux condenser were placed and dissolved 76 parts of water and 20 parts of an acrylic acid-maleic acid copolymer; which contains an ingredient of molecular weight 300 to 2,500 in 41% by weight and an ingredient having a molecular weight of from over 2,500 to 5,000 or less in 27% by weight, that in turn contains an ingredient of molecular weight 300 to 5,000 in 68% by weight; and wherein the mole ratio of acrylic acid to maleic acid was 7 to 3. With stirring, 1.8 parts of adipinic acid diglycidyl ester ("DENACOL EX-701", a product trade name by Nagase Kasei Co., Ltd.) was added to the above mixture, which was then warmed to 95° C. The mixture was maintained for 5 hours under these conditions to complete reaction and then, cooled to room temperature, completely neutralized with an aqueous sodium hydroxide solution, and poured into 2,000 parts of methanol. A precipitate thus-formed was taken by filtration and dried at 60° C. under a reduced pressure, whereby 21 parts of a hydrophilic crosslinked polymer was obtained.

The viscosity determined for this hydrophilic crosslinked polymer similarly to the case of example 1 was 320 cP. Molecular weight distribution of the acrylic acid-maleic acid copolymer part was the same as that of the precrosslinking acrylic acid-maleic acid copolymer.

COMPARATIVE EXAMPLE 1

The polyacrylic acid, which was used in the example 1 and contained an ingredient of molecular weight 300 to 2,500 in 68% by weight and an ingredient having a molecular weight of from over 2,500 to 5,000 or less in 11% by weight, that in turn contained an ingredient of molecular weight 300 to 5,000 in 79% by weight, was converted into its sodium salt without crosslinking treatment and then, subjected to the following tests.

COMPARATIVE EXAMPLE 2

Sodium polyacrylate, which contained an ingredient of molecular weight 300 to 2,500 in 1% by weight and an ingredient having a molecular weight of from over 2,500 to 5,000 or less in 5% by weight and an ingredient of molecular weight 5,000 to 50,000 in 65% by weight, that in turn contained an ingredient of molecular weight 300 to 5,000 in 6% by weight, was not crosslinked and, without any treatment, subjected to the following tests.

Concerning the hydrophilic crosslinked polymers obtained from the above-described examples and the polymers obtained from the comparative examples, the content of functional group (I), whether or not the bonds formed between main chains of the polymers have the group (II) or (III), biodegradability, the chelating and dispersing effects were examined according to the following procedure.

The content of functional group (I) was determined by taking an aqueous solution or a dispersed-in-water solution of the polymer, neutralizing this solution by titrating with a 0.1N aqueous sodium hydroxide solution using an automatic titration apparatus GT-01 model (made by Mitsubishi Kasei Kogyo Co., Ltd.), and counting an amount of the sodium hydroxide solution required for neutralization, and it was indicated by a mole number being contained in 1 g of the polymer.

Whether or not the bonds formed between main chains of the polymers have the group (II) or (III) was examined by the presence or absence of ester or amide absorption bands on the infrared absorption spectra.

The biodegradability was examined by adding activated sludge into a culture medium solution having the composition shown in Table 1, carrying out shaking culture at 30° C. for 30 days, treating with gel permeation chromatography, and looking at variation of the peak shape before and after the culture (decreasing percentage of the peak area), and the results were evaluated according to the following standards.

⊚: decrease of the peak area was 50% or more.
◯: decrease of the peak ares was in a range of from 10% up to 50%.
Δ: decrease of the peak ares was less than 10%.
X: almost no change of the peak area.

TABLE 1

| Composition of culture medium solution | |
|---|---|
| crosslinked polymer or polymer | 1 g |
| ammonium sulfate | 1 g |
| potassium dihydrogen phosphate | 0.5 g |
| dipotassium hydrogen phosphate | 0.5 g |
| magnesium sulfate | 0.2 g |
| sodium chloride | 0.1 g |
| yeast extract | 0.1 g |

TABLE 1-continued

| Composition of culture medium solution | |
|---|---|
| calcium sulfate | 2 mg |
| ferrous sulfate | 2 mg |
| manganese sulfate | 2 mg |
| zinc sulfate | 7 mg |
| distilled water | 1000 ml |

The chelating effect was measured by taking 10 mg of a crosslinked polymer or a polymer as a sample into a 50 ml beaker, dissolving the sample in 50 ml of an aqueous solution which was prepared so as to have calcium chloride at a concentration of $1.0 \times 10^{-3}$M and potassium chloride at a concentration of 0.08M, stirring the sample solution, determining the calcium ion concentration in the solution using a divalent cation electrode (MOdel 93-32, made by Orion Research Incorporated) and an ion analyzer (Model EA 920, made by Orion Research Incorporated), and converting an amount of the calcium ion chelated by 1 g of the crosslinked polymer or the polymer into mg of calcium carbonate.

The dispersion effect was measured by preparing a slurry so as to have a 60:40 weight ratio of calcium carbonate (BRILLIANT 1500, a product trade name by Shiraishi Kyokgo Co., Ltd.) to water, adding into the slurry a crosslinked polymer or a polymer in 0.3% by weight of the calcium carbonate content in the slurry, then stirring for 3 minutes, and after standing the polymer-slurry mixture for 1 minute, measuring viscosity by a B type rotatory viscosimeter VISMETRON VG-A/1 model (made by Seiki Kyogyo Kenkyusho) to show the viscosity by a centipoise unit. Besides, when the crosslinked polymer or the polymer is not added, the slurry has almost no fluidity and the viscosity measurement was impossible.

Results thus-obtained are shown in Table 2.

TABLE 2

| | Example | | | | | | | Comparative example | |
|---|---|---|---|---|---|---|---|---|---|
| | 1 | 2 | 3 | 4 | 5 | 6 | 7 | 1 | 2 |
| Viscosity of polymer at 20° C. (cp) | 73 | 150 | 85 | 92 | 82 | 80 | 320 | 5 | 80 |
| Amount of functional group (I) (mmol/g) | 6.3 | 7.2 | 7.3 | 6.2 | 7.6 | 7.4 | 7.3 | 9.8 | 10.2 |
| Whether or not the bonds formed between main chains have the group (II) or (III) | yes | yes | yes | yes | yes | yes | yes | no | no |
| Biodegradability | ⊚ | Δ | ◯ | ◯ | ◯ | ⊚ | ◯ | ⊚ | X |
| Chelating effect (mg-CaCO₃/g) | 150 | 167 | 171 | 141 | 180 | 185 | 178 | 80 | 236 |
| Dispersing effect (cp) | 1000 | 320 | 700 | 900 | 370 | 850 | 1800 | 9000 | 400 |

As seen in Table 2, the crosslinked polymers of the examples were satisfactory for all the biodegradability and chelating and dispersing effects. In contrast, those of the comparative examples were satisfactory for the biodegradability, but not for the chelating and dispersing effects. Otherwise, those were satisfactory for the chelating and dispersing effects, but not satisfactory for the biodegradability.

EXAMPLES 8 TO 14 AND COMPARATIVE EXAMPLES 3 AND 4

Using the crosslinked polymers of examples 1 to 7 and the compounds of comparative examples 1 and 2 as builders, detergent compositions were obtained with the following formulation.

| | |
|---|---|
| Sodium alkylbenzenesulfonate | 25 parts |
| Builder | 20 parts |
| Sodium silicate | 5 parts |
| Anhydrous sodium carbonate | 3 parts |
| Carboxymethylcellulose | 0.5 parts |
| Anhydrous sodium sulfate | 40 parts |
| Water | residue |
| Total of detergent composition | 100 parts |

Detergency of the detergent compositions obtained from the examples and comparative examples were examined and results are shown in Table 3.

The detergency was tested by using each of the crosslinked polymers of the examples and the compounds of the comparative examples as a sample builder, preparing a detergent solution by dissolving the detergent composition obtained with the above-described formulation in tap water of hardness 3° DH (Japanese hardness) so as to have a 0.2% by weight concentration, immersing an artificially contaminated cotton cloth in a detergent solution of 25° C. (bath ratio: 30 times), and performing washing for 10 minutes at 100 rpm using a detergent device (Terg-O-Tometer, made by Ueshima Seisakusho) and then, performing rinsing for 5 minutes with tap water of 3° DH at 25° C. using the same device, and wind-drying.

Contamination-free condition of the cloth treated by the washing and rinsing were evaluated by taking the compound of comparative example 2 as a standard builder and seeing by a naked eye in comparison with the standard, and the evaluation was given by the following standards.

⊙: excellent
○: almost the same
Δ: somewhat inferior
X: considerably inferior

TABLE 3

| | Builder | Detergency |
|---|---|---|
| Example 8 | Example 1 | ○ |
| Example 9 | Example 2 | ○ |
| Example 10 | Example 3 | ○ |
| Example 11 | Example 4 | ○ |
| Example 12 | Example 5 | ⊙ |
| Example 13 | Example 6 | ○ |
| Example 14 | Example 7 | ○ |
| Comparative example 3 | Comparative example 1 | X |
| Comparative example 4 | Comparative example 2 | — |

As seen in Table 3, the crosslinked polymers of the examples showed excellent detergency compared with the compounds of the comparative examples.

Synthetic Example 1

Into a four-necked flask equipped with a thermometer, stirrer and reflux condenser were charged 196 parts of maleic anhydride (232 parts as maleic acid), 140 parts of deionized water and 0.0412 parts of iron (III) ammonium sulfate 12 hydrate (20 ppm as $Fe^{3+}$ in 1 part of the charged monomer component) and, by stirring this mixture, an aqueous solution was made, which was warmed up to the boiling temperature under ordinary pressure. Then, into this aqueous solution was added dropwise and continuously 777 parts of 35% aqueous hydrogen peroxide (in a ratio of 136 g of $H_2O_2$ per 1 mole of the charged monomer component) during 5 hours to complete a polymerization reaction, whereby an aqueous solution of the water-soluble oligomer (1) (solid portion was 21%) was obtained. An acid value per the solid portion of this water-soluble oligomer (1) was determined by titration and then, a number of the carboxylic acid unit (an average value) per one molecule of the water-soluble oligomer and a content of the functional group (I) were obtained by calculation. Results are shown in Table 4.

Synthetic Example 2

The polymerization procedure of synthetic example 1 was repeated except that, after the same materials as those in the synthetic example 1 were charged, 777 parts of 35% aqueous hydrogen peroxide and 180.25 parts of a 80% aqueous acrylic acid solution were added dropwise and continuously during 5 hours from respectively different dropping inlets to complete polymerization, whereby an aqueous solution of the water-soluble oligomer (2) (solid portion was 27%) was obtained. Analysis of this aqueous solution of water-soluble oligomer (2) was performed similarly to the case of the synthetic example 1 and results obtained are shown in Table 4.

TABLE 4

| | Synthetic Example | |
|---|---|---|
| Properties of obtained water-soluble oligomer | 1 | 2 |
| Numbering of aqueous solution of water-soluble oligomer | (1) | (2) |
| Character | | |
| Molecular weight | 400 | 500 |
| Acid value (mgKOH/g) | 850 | 600 |
| Content of functional group (I) (mmol/g) | 15.2 | 10.7 |
| Number of carboxylic acid unit per molecule (average value) (piece) | 4.5 | 5.4 |
| Percentage of an ingredient of molecular weight 30 to 2500 (%) | 70 | 80 |

EXAMPLE 15

In a glass-made plate were placed 100 parts of the aqueous solution of water-soluble oligomer (1) obtained from the synthetic example 1, 50 parts of citric acid and 2 parts of 48% aqueous sodium hydroxide and, the mixture was made homogeneous with stirring and treated by heating eliminating water by blowing hot air at 150° C. for 2 hours, whereby the hydrophilic crosslinked polymer (15) was obtained.

The molecular weight of obtained hydrophilic crosslinked polymer (15) was determined by gel permeation chromatography under the above-described conditions and the acid value was obtained by titration. Concerning the hydrophilic crosslinked polymer (15), viscosity, whether or not the bond formed between main chains has the group (II) or (III), biodegradability, chelating and dispersing effects were investigated by the same measurements as those in the examples 1 to 7. Results from these measurements are shown in Table 5.

In using the hydrophilic crosslinked polymer (15) as a fiber-treating agent and a water treatment agent, its performance was evaluated according to the undermentioned method. Results obtained are shown in Table 6.

In using the hydrophilic crosslinked polymer (15) as an inorganic pigment dispersant, its performance was evaluated, in addition to evaluation of the dispersing effect, by investigating the viscosity stability which was determined by viscosity measured after standing for 1 week at room temperature. Results obtained are shown in Table 6.

In using the hydrophilic crosslinked polymer (15) as a cleaner, its performance was evaluated similarly to the cases of examples 8 to 14. Results obtained are shown in Table 6.

Evaluation in using the hydrophilic crosslinked polymer as a fiber-treating agent 1. Dyeing-improving capability and dye-dispersing performance (evaluation in using as a dyeing assistant)

A cotton twill fabric was dyed under the following conditions. As a dyeing improver, the hydrophilic crosslinked polymer obtained from the example 15 was used in a proportion of 1 g (in an amount converted into a solid portion) to 1 liter of water.

dyeing conditions

Hardness of water used —30° DH (German hardness)
Dye (Kayaras Supra Blue 4BL) —1% by weight (a metal-containing direct type dye, made by Nihon Kayaku Co., Ltd.)
Sodium sulfate —10% by weight
Bath ratio —1:30
Temperature —95° C.
Time —30 minutes After dyeing, the color of a cloth was measured by a SM color computer SM-3 model, made by Suga Shikenki Co., Ltd., and a hue value (a value on a Munsell hue ring) was determined. In the hue value, PB means a blue purple color between purple and blue, and a blue purple color closer to the blue is shown by a smaller value, which indicates superior dyeing performance. Partial color unevenness was observed by seeing by a naked eye. Furthermore, 300 g of a mixed solution of water used in the above-described dyeing, a dye (0.1%) and a hydrophilic crosslinked polymer (0.1%) was prepared, stood for 24 hours, and filtered using a 5C filter paper made by Toyo Roshi Co., Ltd. Then, the dye-dispersing performance was evaluated by the standards; no residue on filtrating by ○, some residue on filtrating by Δ, and a large amount of residue by X.

2. Bleaching performance and sewing performance (evaluation in using as a bleaching assistant)

A scoured indian cotton woven knitting was bleached under the following conditions. As a bleaching assistant, the hydrophilic crosslinked polymer obtained from the example 15 was used in a proportion of 1 g (in an amount converted into a solid portion) to 1 liter of water.

Bleaching conditions

Hardness of water used—35° DH
Bath ratio—1:25
Temperature—85° C.
Time—30 minutes

Chemicals used

Hydrogen peroxide—10 g/liter
sodium hydroxide—2 g/liter
sodium silicate (No. 3)—5 g/liter After bleaching, the feeling of a cloth is determined by a sensory test method, and a soft feeling is indicated by ○, a somewhat hard feeling by Δ, and a considerably hard feeling by X. The whiteness W is determined by subjecting to colorimetry by a SM color computer SM-3 model (made by Sugashikenki Co., Ltd.) followed by calculating those by the following Lab type whiteness equation.

$$W = 100 - [(100-L)^2 + a^2 + b^2]^{\frac{1}{2}}$$

here, L=measured lightness
a=measured chromaticity index
b=measured chromaticity index Furthermore, bleached clothes were folded to four layers and sewed 30 cm with no string by a sewing machine using No. 11S needle, and then, sewing performance was evaluated by examining positions where thread was cut. Evaluation in using the hydrophilic crosslinked polymer as a water treatment agent 1. Scale-suppresive percentage In a glass bottle of 225 ml volume was placed 170 g of water and, with this water, were mixed 10 g of a 1.56% aqueous calcium chloride dihydrate solution and 3 g of a 0.02% aqueous solution of the hydrophilic crosslinked polymer (3 ppm to a getting supersaturated aqueous solution) obtained from the example 15 as a scale suppresant and, furthermore, to the obtained mixture were added 10 g of a 3% aqueous sodium hydrogen carbonate and 7 g of water, so that the total volume became 200 g. An obtained supersaturated aqueous solution of 530 ppm of sodium carbonate was sealed with a stopper and treated by heating at 70° C. for 8 hours. After cooling, an obtained precipitate was taken out by filtration using a membrane filter of hole diameter 0.1 μm and then, a filtrate was analyzed according to JIS (Japanese Industrial Standard) K0101. By the following equation, the calcium carbonate scale-suppresive percentage (%) was obtained.

$$\text{scale-suppresive \%} = (C-B)/(A-B)$$

here, A: a calcium concentration dissolved in the solution before testing.
B: a calcium concentration in the solution, to which a scale inhibitor is not added.
C: a calcium concentration in the filtrate after testing.

EXAMPLES 16 to 21

The procedure of example 15 was repeated to obtain the hydrophilic crosslinked polymers 16 to 21 except that the kind and amount of a water-soluble oligomer and those of a crosslinking agent and an amount of 48% aqueous sodium hydroxide were as shown in Table 5. Concerning the obtained hydrophilic crosslinked polymers 16 to 21, performance evaluation was carried out similarly to the case of example 15. Results obtained are shown in Table 5.

Also, when the obtained hydrophilic crosslinked polymers 16 to 21 were used as fiber-treating agents, water treatment agents, inorganic pigment dispersants and detergents, their evaluation was carried out similarly to the case of example 15. Results obtained are shown in Table 6.

TABLE 5

| | Example | | | | | | |
|---|---|---|---|---|---|---|---|
| | 15 | 16 | 17 | 18 | 19 | 20 | 21 |

Formulation of raw

TABLE 5-continued

| materials (part) | Example | | | | | | |
|---|---|---|---|---|---|---|---|
| | 15 | 16 | 17 | 18 | 19 | 20 | 21 |
| Number and amount of aqueous solution of a water-soluble oligomer | (1) 100 | (1) 100 | (1) 100 | (1) 100 | (1) 100 | (2) 100 | (2) 100 |
| Kind and amount of a cross-linking agent | 50 of citric acid | 50 of tartaric acid | 2.5 of D-sorbitol | 2.5 of glycerin | 10 of citric acid | 50 of citric acid | 50 of tataric acid |
| 48% NaOH | 2 | 2 | 2 | 2 | 2 | 2 | 2 |
| Numbering and properties of crosslinked polymer | | | | | | | |
| Number | (15) | (16) | (17) | (18) | (19) | (20) | (21) |
| Weight-average molecular weight (MW) | 1800 | 1600 | 1500 | 1200 | 1700 | 1800 | 1600 |
| Acid value (mgKOH/g) | 420 | 400 | 200 | 500 | 450 | 400 | 420 |
| Viscosity of polymer at 20° C. (cp) | 3.8 | 3.5 | 2.0 | 2.5 | 2.8 | 3.7 | 3.5 |
| Whether or not the bonds formed between main chains have the group (II) or (III) | yes | yes | yes | yes | yes | yes | yes |
| Biodegradability | ⊙ | ⊙ | ⊙ | ⊙ | ⊙ | ⊙ | ⊙ |
| Chelating effect (mg-CaCO$_3$/g) | 160 | 150 | 120 | 130 | 160 | 180 | 160 |
| Dispersing effect (cp) | 520 | 600 | 700 | 680 | 630 | 400 | 520 |

TABLE 6

| | | Example | | | | | | |
|---|---|---|---|---|---|---|---|---|
| | | 15 | 16 | 17 | 18 | 19 | 20 | 21 |
| Fiber-treating agent | Hydrophilic crosslinked polymer | (15) | (16) | (17) | (18) | (19) | (20) | (21) |
| | Hue value | 2.52 | 2.52 | 2.51 | 2.53 | 2.51 | 2.53 | 2.53 |
| | Partial color unevenness | none | none | none | none | none | none | none |
| | Dye dispersion | ○ | ○ | ○ | ○ | ○ | ○ | ○ |
| | Feeling | ○ | ○ | ○ | ○ | ○ | ○ | ○ |
| | Whiteness | 91 | 92 | 93 | 91 | 92 | 93 | 91 |
| | Sewing performance | 46 | 45 | 47 | 48 | 47 | 48 | 47 |
| Inorganic pigment dispersant | Viscosity of dispersed-in-water solution (cps) | | | | | | | |
| | immediately after production | 520 | 600 | 700 | 680 | 630 | 400 | 520 |
| | after standing at room temperature for 1 week | 590 | 630 | 750 | 730 | 720 | 500 | 580 |
| Water treatment agent | Scale inhibitor percentage (%) | 76 | 70 | 72 | 70 | 73 | 71 | 75 |
| Detergent | Detergency | ○ | ○ | ○ | ○ | ○ | ○ | ○ |

Comparative Examples 5 to 8

Concerning the comparative agents described in Tables 7 and 8, whether or not the bond formed between main chains has the group (II) or (III), biodegradability, and chelating and dispersing effects were examined similarly to the case of example 15. Results obtained are shown in Table 7. Also, they were similarly evaluated in using as fiber-treating agents, water treatment agents, inorganic pigment dispersants and detergents. Results obtained are shown in Table 8.

TABLE 7

| | Comparative example | | | |
|---|---|---|---|---|
| | 5 | 6 | 7 | 8 |
| Comparative agent | water-soluble oligomer (1) | water-soluble oligomer (2) | sodium citrate | sodium tartarate |
| Whether or not the bonds formed between main chains have the group (II) or (III) | no | no | no | no |
| Biodegradability | ⊙ | ⊙ | ⊙ | ⊙ |
| Chelating effect (mg-CaCO$_3$/g) | 100 | 120 | 170 | 150 |
| Dispersing effect (cp) | 5500 | 3200 | 15000 | 21000 |

TABLE 8

| | | Comparative example | | | |
|---|---|---|---|---|---|
| | | 5 | 6 | 7 | 8 |
| Fiber-treating agent | Comparative agent | water-soluble oligomer (1) | water-soluble oligomer (2) | sodium citrate | sodium tartarate |
| | Hue value | 2.71 | 2.75 | 2.85 | 2.73 |
| | Partial color unevenness | yes | yes | yes | yes |
| | Dye dispersion | X | X | X | X |
| | Feeling | X | X | X | X |

TABLE 8-continued

|  |  | Comparative example | | | |
|---|---|---|---|---|---|
|  |  | 5 | 6 | 7 | 8 |
| Inorganic pigment dispersant | Whiteness | 82 | 81 | 81 | 82 |
|  | Sewing performance | 65 | 67 | 83 | 88 |
|  | Viscosity of dispersed-in-water solution (cps) | | | | |
|  | immediately after production | 5500 | 3200 | 15000 | 21000 |
|  | after standing at room temperature for 1 week | 8500 | 7200 | unmeasurable | unmeasurable |
| Water treatment agent | Scale inhibitor percentage (%) | 42 | 53 | 41 | 37 |
| Detergent | Detergency | Δ | Δ | Δ | X |

The hydrophilic crosslinked polymers of this invention have chelating and dispersing effects and are excellent in dispersion into water as well as superior in biodegradability.

The process for producing the hydrophilic crosslinked polymers of this invention can make efficiently such crosslinked polymers.

When the hydrophilic crosslinked polymers of this invention are used as a detergent, they can elevate detergency by being combined with the detergent, and to degradate the polymers is possible by an organism such as a microorganism. Also, when a detergent combined with the crosslinked polymers is excreted into a river, lake or marsh, it does not cause eutrophication and, therefore, it is useful as a safe builder.

What is claimed are:

1. A biodegradable, hydrophilic crosslinked polymer, comprising
   (1) main chains prepared from a water-soluble oligomer, said oligomer containing
      (a) at least 50% by weight of a molecule having a maximum molecular weight of 5000 and
      (b) a functional group having the formula —COOM, wherein M denotes hydrogen, monovalent metal, divalent metal, trivalent metal, an ammonium group and an organic amine group, and
   (2) crosslinking bonds having at least one group selected from the group consisting of the groups represented by the following chemical formulas:

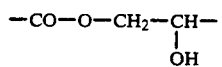 (I)

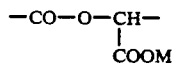 (II)

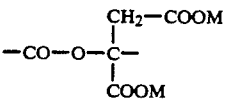 (III)

and

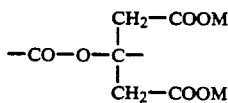 (IV)

wherein M is as previously defined, and
wherein a 20% by weight aqueous solution of said polymer has a maximum viscosity of 1,000 cps at 20° C.

2. The biodegradable, hydrophilic crosslinked polymer of claim 1, wherein the chemical formula I is an ester linkage formed by reaction of a water-soluble oligomer containing a functional group having the formula —COOM with a crosslinking agent having an epoxy group;

the chemical formula II is an ester linkage formed by reaction of the water-soluble oligomer containing a functional group having the formula —COOM with a crosslinking agent having a hydroxyl group, said crosslinking agent having at least two carbon atoms each of which has one functional group having the formula —COOM and said hydroxyl group; and the chemical formulas III and IV are ester linkages formed by reaction of a water-soluble oligomer containing a functional group having the formula —COOM with a crosslinking agent having a hydroxyl group, said crosslinking agent having at least three carbon atoms, one of said at least three carbon atoms having one functional group having the formula —COOM and said hydroxyl group, and other two of said at least three carbon atoms having one functional group having the formula —COOM respectively.

3. A process for producing a biodegradable, hydrophilic crosslinked polymer, comprising
   (1) providing a water-soluble oligomer, said oligomer containing
      (a) at least 50% by weight of a molecule having a maximum molecular weight of 5000 and
      (b) a functional group having the formula —COOM, wherein M denotes hydrogen, monovalent metal, divalent metal, trivalent metal, an ammonium group and an organic amine group, and
   (2) crosslinking said oligomer with a crosslinking agent having at least one functional group selected from the group consisting of esters and amides, or functional groups which form one of the esters and amides when reacted with said water-soluble oligomer; and
   wherein a 20% by weight aqueous solution of said polymer has a maximum viscosity of 1,000 cps at 20° C.

4. The process of claim 3, wherein the water-soluble oligomer is a water-soluble oligomer (A); which is made by polymerizing a monomer component, composed of 50 to 100 mole % of at least one monomer (a) selected from the group consisting of a monoethylenically unsaturated carboxylic acid of 3 to 6 in carbon number and salts of this acid, and a residual % of another monoethylenically unsaturated monomer (b) capable of copolymerizing with (a); and said water-soluble oligomer (A) comprises an ingredient having a molecular weight of 5,000 or less in 50% by weight or more and further, has the functional group (I);

the crosslinking agent is a compound (B), which has at least two of the functional group (IV) capable of reacting with a functional group which the water-soluble oligomer (A) has, and which has either (not only) at least one of the groups (II) and (III) between said functional group (IV), or (but also) is capable of forming at least one of the groups (II) and (III) by a reaction of the functional group (IV) with the functional group which the water-soluble oligomer (A) has;

the reaction of said water-soluble oligomer (A) with the compound (B) is carried out by using those in such amounts as the mole ratio between the functional group (IV) of the compound (B) to the functional group of the water-soluble oligomer (A) is shown by the equation;

$$\frac{\text{the functional group (IV)}}{\text{the functional group of (A)}} = 0.01 \sim 1.0.$$

5. The process of claim 4, wherein the monomer (a) is at least one member selected from a group consisting of acrylic acid, methacrylic acid, maleic acid and their salts.

6. The process of claim 4 wherein;
the water-soluble oligomer (A) is a maleic acid-based polymer made by polymerizing the monomer component, composed of 20 to 100% by weight of at least one kind selected from maleic acid and its salt and of a residue % by weight of another water-soluble monoethylenically unsaturated monomer, in an aqueous solution and in the presence of at least one metal ion selected from a group consisting of an iron ion, a vanadium atom containing ion and a copper ion in a weight ratio of from 0.5 to 300 ppm to said monomer component, and using hydrogen peroxide as a polymerization catalyst in the proportion of 8 to 500 g per 1 mole of said monomer component, and thereby, said maleic acid-based polymer contains an ingredient of molecular weight 5,000 or less in 50% by weight or more and has the functional group (I).

7. The process claimed in claim 4, wherein the compound (B) is at least one member selected from a group consisting of polyglycidyl compounds, polyhydric alcohols and polyamine.

8. The process claimed in claim 4, wherein the compound (B) is a compound having both the carboxyl group and hydroxyl group.

9. The process claimed in claim 3 or 4, wherein the crosslinking reaction is carried out by treating with heat at a temperature of from 50° to 200° C. to eliminate water.

10. The process of claim 3, wherein the functional groups which are formed by reaction of said oligomers with a crosslinking agent are the groups represented by the following chemical formulas:

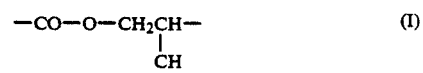

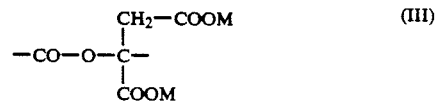

and

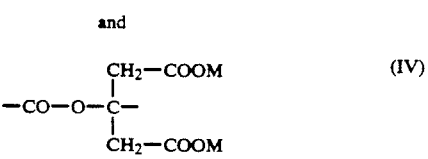

wherein M is as previously defined.

11. The process of claim 10, wherein the crosslinking agent is selected from the group consisting of:
a compound having an epoxy group;
a compound having at least two carbon atoms each of which has one functional group having the formula —COOM and one hydroxyl group; and
a compound having at least three carbon atoms, one of said at least three carbon atoms having one functional group having the formula —COOM and one hydroxyl group, and other two of said at least three carbon atoms having one functional group having the formula —COOM respectively.

* * * * *